Figure 1:
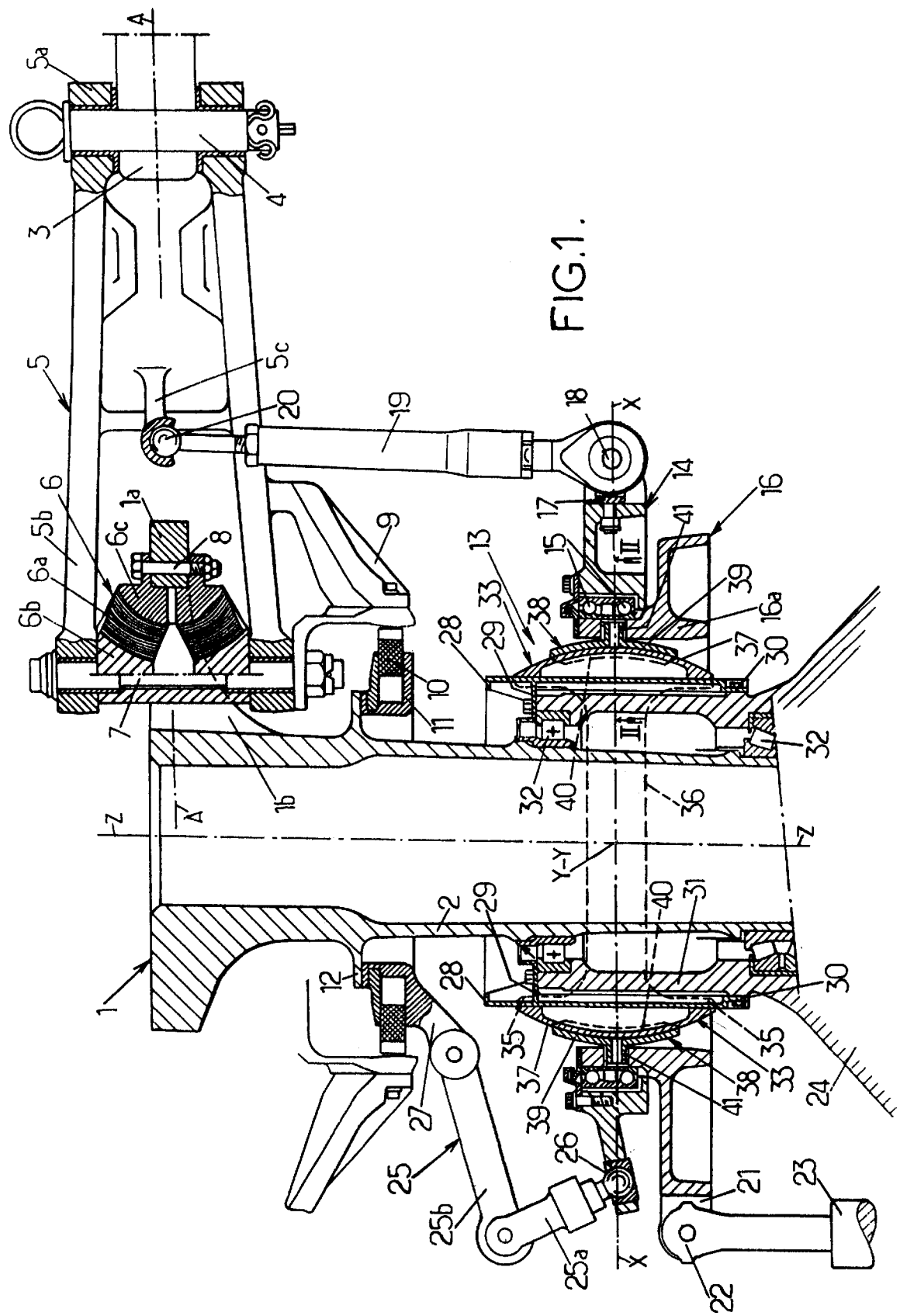

United States Patent [19]
Rampal et al.

[11] Patent Number: 6,074,168
[45] Date of Patent: Jun. 13, 2000

[54] SWASH-PLATE DEVICE FOR CONTROLLING THE PITCH OF THE BLADES OF A ROTOR WITH ROTARY GUIDED PARTS ON SLIDES TRANSLATED ALONG THE ROTOR AXIS

[75] Inventors: Etienne Rampal, Marseilles; Sylvie Jacqueline Garcin, Carry le Rouet, both of France

[73] Assignee: Eurocopter, France

[21] Appl. No.: 09/203,731

[22] Filed: Dec. 2, 1998

[30] Foreign Application Priority Data

Dec. 3, 1997 [FR] France ..................... 97 15218

[51] Int. Cl.[7] .................................. B64C 27/605
[52] U.S. Cl. ............... 416/114; 416/134 A; 416/141; 416/170 R
[58] Field of Search .................. 416/114, 115, 416/134 A, 141, 170 R

[56] References Cited

U.S. PATENT DOCUMENTS

| | | |
|---|---|---|
| 3,602,059 | 8/1971 | Jupe . |
| 4,375,940 | 3/1983 | Lovera et al. ............... 416/114 |
| 4,630,998 | 12/1986 | Leman et al. ............... 416/114 |
| 5,071,319 | 12/1991 | McCafferty ............... 416/134 A |
| 5,199,849 | 4/1993 | Leman ............... 416/114 |

FOREIGN PATENT DOCUMENTS

| | | |
|---|---|---|
| 318 398 | 10/1974 | Austria . |
| 1 294 221 | 5/1965 | Germany . |
| 36 03 400 | 5/1987 | Germany . |
| 36 20 794 | 12/1987 | Germany . |
| 1454835 | 11/1976 | United Kingdom ............... 416/114 |

*Primary Examiner*—Christopher Verdier
*Attorney, Agent, or Firm*—Piper Marbury Rudnick & Wolfe

[57] ABSTRACT

The rotating and non-rotating swash-plates are guided in axial translation and in tilting on the rotor axis by a non-rotating axial guide arrangement, such as two pillars, and slides on each of which slides one of two pads carrying diametrically opposite trunnions, enabling the pivoting of the non-rotating plate around a first diametrical axis, whereas the sliding movements of the pads on the slides guide the pivoting movements of the non-rotating plate around a second diametrical axis perpendicular to the rotor axis and first diametrical axis, and which is the axis of the cylindrical face of the slides.

21 Claims, 5 Drawing Sheets

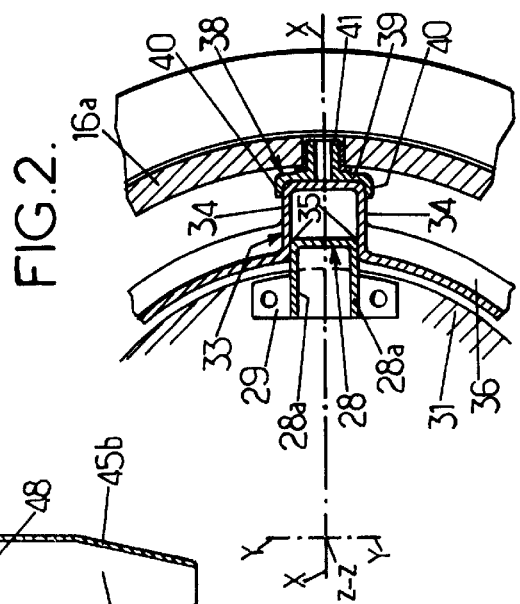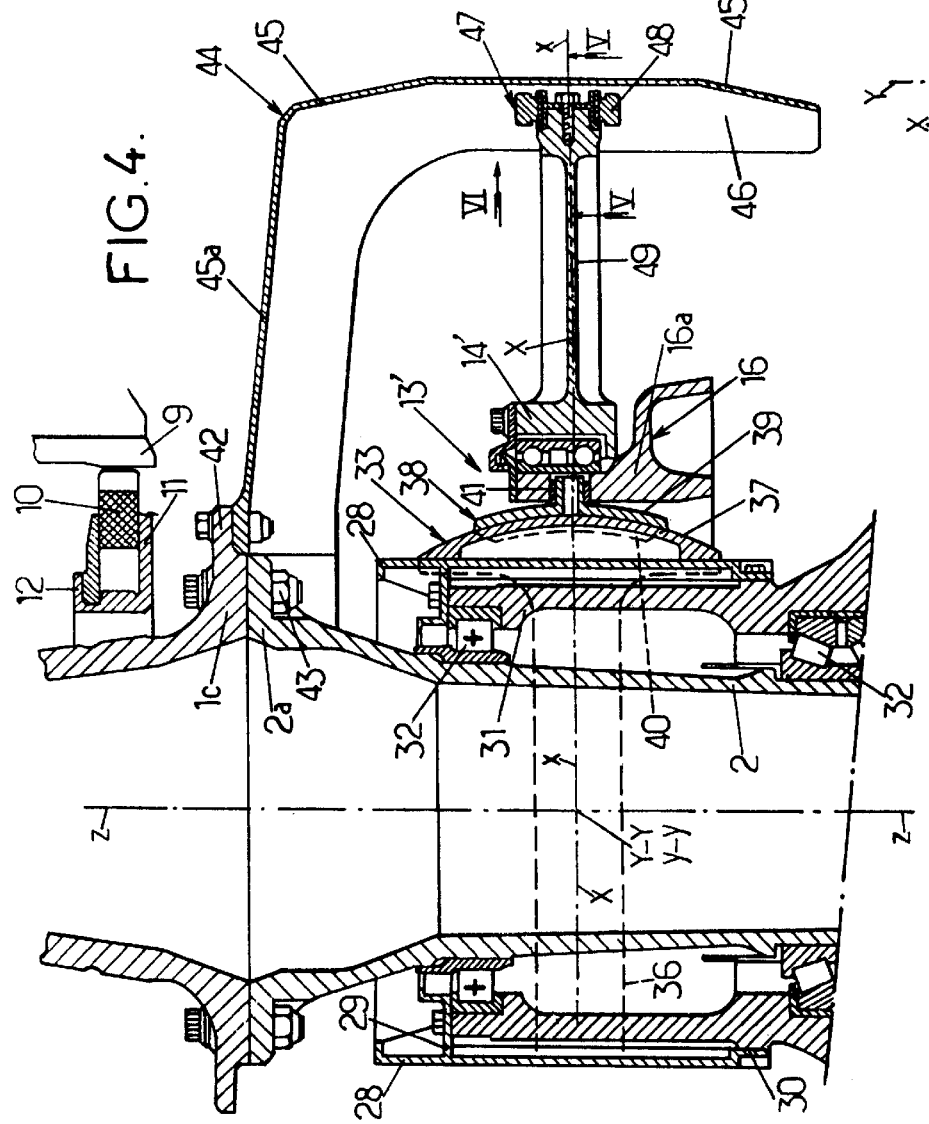

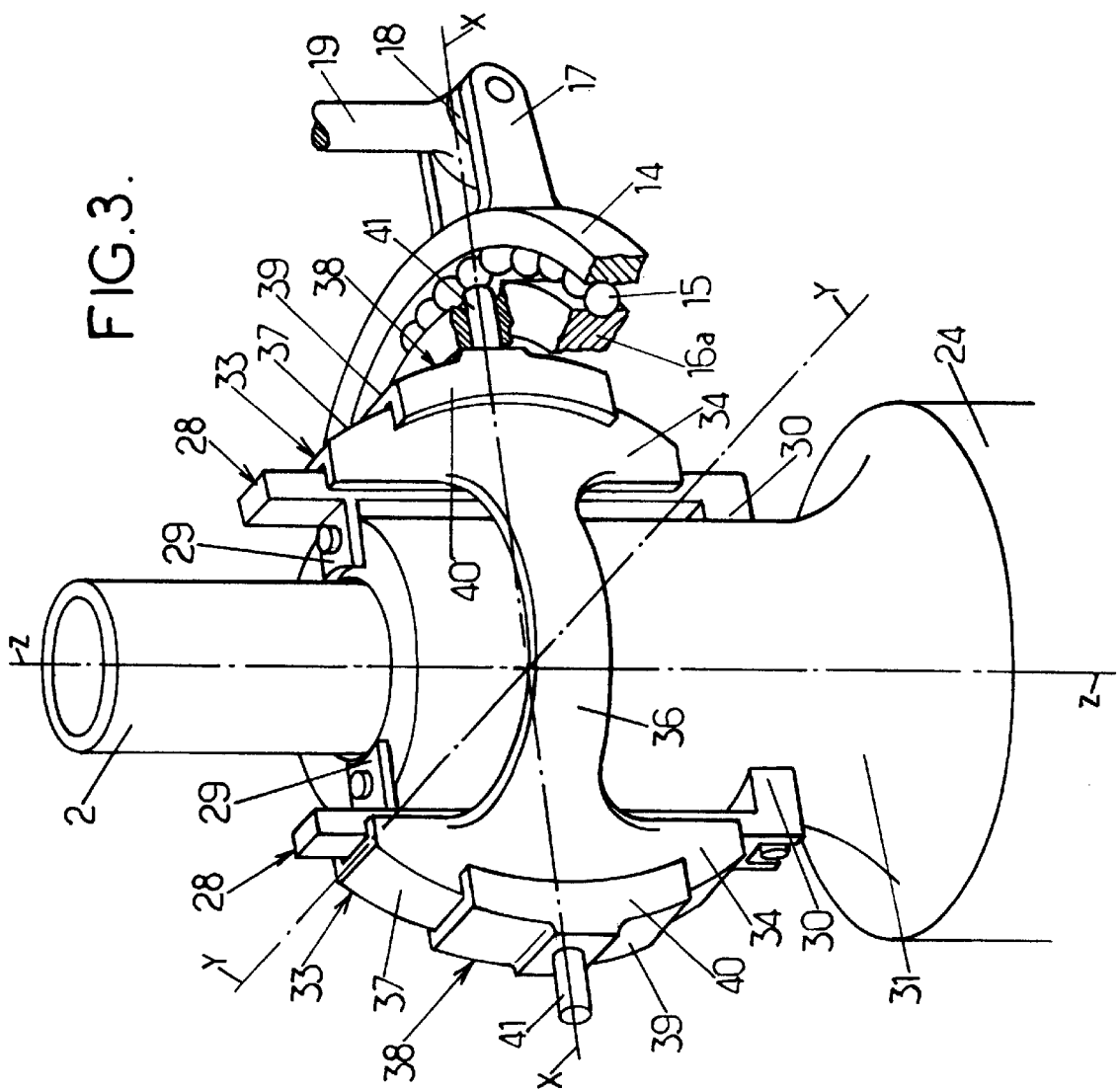

SWASH-PLATE DEVICE FOR CONTROLLING THE PITCH OF THE BLADES OF A ROTOR WITH ROTARY GUIDED PARTS ON SLIDES TRANSLATED ALONG THE ROTOR AXIS

The invention concerns devices for controlling the pitch of rotor aircraft rotor blades, particularly of a helicopter main rotor, the rotor being of the type for which each blade is, on the one hand, rotated around a rotational axis of a rotor shaft, or rotor axis, by means of a hub rotating integrally with the shaft, and, on the other hand, rotating integrally, around a longitudinal blade pitch change axis, with a pitch lever controlled by a corresponding pitch rod.

The invention relates more exactly to a pitch control device of the type including a swash-plate assembly, such that each pitch rod is connected to a plate rotating with the rotor and belonging to the swash-plate assembly, in which the rotating plate rotates on a non-rotating plate, restrained against any rotation around the rotor axis, the two plates being annular, centred on the rotor axis and surrounding this axis, and being able to be axially translated, i.e. parallel to the rotor axis, and tilted in any direction around the rotor axis, under the action of control actuators connecting the non-rotating plate to the rotor aircraft structure, for the respective control of the collective pitch and the cyclic pitch of the blades.

The control device according to the invention is particularly of the type in which, in addition, the non-rotating plate is restrained from rotating with the help of axial guide means non-rotating around the rotor axis, and which are parallel to said rotor axis, diametrically opposite relative to this axis, and connected to the structure, and which guide the plates in translation along the rotor axis with the help of two slides sliding along the axial guide means and belonging to an articulated connection which connects the non-rotating plate to the axial guide means and enables tilting of the plates in any direction around the rotor axis by pivoting the non-rotating plate around two diametrical axes of this latter, which axes are perpendicular to each other and one of which remains perpendicular to the rotor axis, the pivoting around a first of the two pivoting axes being ensured, in diametrically opposite positions on the non-rotating plate, by two trunnions pivoting in radial and coaxial bores.

Such a pitch control device, known in a general way by DE-A-36 20 794, in which the axial guide means are two pillars parallel to the rotor axis and diametrically opposite relative to this axis, enable the height of the rotor shaft-hub assembly and swash-plate device to be reduced relative to the standard embodiments, in which, the swash-plates are able to be axially translated and tilted by an axial translation and tilting guide mechanism which includes a central ball joint, centred on the rotor axis, and on which the non-rotating plate, and therefore the swash-plates, are oscillating mounted, the ball joint being itself mounted to slide axially (parallel to the rotor axis) around a cylindrical guide coaxial with the rotor axis and non-rotating around this rotor axis, and generally fixed relative to the rotor aircraft structure. When the swash-plates surround the rotor shaft, which is most often the case, the cylindrical guide is tubular, surrounds the rotor shaft, and is fixed to a housing integral with the rotor aircraft structure and surrounding the connection between the rotor shaft base and the main gear box.

In these standard embodiments, one or several rotating and upper or non-rotating and lower connecting part(s), which connect respectively the rotor to the rotating plate in order to rotate this latter, and the structure to the non-rotating plate, in order to prevent this latter from any rotation around the rotor axis, is or are one or more scissor-articulated torque links with two arms connected to each other by a pivot or a hinge, which enables the two arms of each torque link to move apart or draw together in order to enable movements in the direction of the rotor axis, since the upper and lower arms of a rotating torque link are moreover articulated on the rotor shaft or the hub and on the rotating plate respectively, and as the lower and upper arms of a non-rotating torque link are moreover articulated on the structure of the rotor aircraft and on the non-rotating plate.

The drawbacks of these rotating and non-rotating torque links are that their articulations comprise traditional, unreliable, bearings, or, on more recent helicopters, self-lubricating ball joints and bearings including numerous carbide pins and rings, which are heavy and expensive.

Furthermore, a certain overall height or axial requirement (parallel to the rotor axis) and width requirement is necessary for the torque links to operate correctly. So, to facilitate their loading for example in the hold of a transport aircraft and to improve their capacity to be accommodated in a hangar, for example of a ship, modern helicopters must offer the best possible vertical or axial compactness of the shaft and the main rotor assembly and of the swash-plate assembly which surrounds it. But reduction in the height or axial space requirement of such an assembly is limited by the interference between the two arms of a torque link during folding of the latter and by the maximum swivelling angles permitted by the construction of the articulation ball joints of the torque links.

The axial space requirement of a swash-plate control device with torque links being mainly determined by the clearances of the torque links, because of the folding and pivoting angles necessary for their operation, it has already been proposed, in order to reduce the height of such an assembly, to remove either the rotating torque link(s), or the non-rotating torque link(s), and to use two guide pillars parallel to each other and to the rotor axis and on either side of this axis in a same radial plane passing through the rotor axis, in an axial translation and tilting guide mechanism for the swash-plates which includes also a cardan joint connection, with an intermediate ring mounted sliding axially with the help of the pillars, and pivoted on these pillars around a diametrical axis of the ring, which is an axis remaining perpendicular to the rotor axis, whereas the ring is pivoted on one of the swash-plates around another diametrical axis of the ring, which is perpendicular to the first diametrical axis, as proposed by DE-A-36 03 400 and DE-A-36 20 794. Thus, the axial movements of the swash-plates and of the ring are guided by the two pillars, whereas the tilting movements of the swash-plates in any direction around the rotor axis are obtained by pivoting the swash-plates relative to the ring around one of the two diametrical and perpendicular axes of the ring, and by pivoting the ring on the pillars around the other of these two diametrical and perpendicular axes.

The guide pillars can be rotating (rotating integrally with the rotor), and so too can the ring mounted in this case between the rotating pillars, on the one hand, and, on the other hand, the rotating plate thus rotated by the pillars and the ring which replace the rotating torque link(s). But the guide pillars can also be non-rotating, i.e. restrained against any rotation around the rotor axis by a support fixed to the rotor aircraft structure, in which case the ring is also non-rotating and mounted between, on the one hand, the non-rotating pillars, and, on the other hand, the non-rotating plate, thus restrained from rotating by the non-rotating pillars and the non-rotating ring, which replace the non-rotating torque link(s).

If pillar and cardan ring devices have the advantage of obtaining a saving in (axial) height compared with torque link devices, it nevertheless remains that the pillar devices have the drawbacks of a greater transverse space requirement, due to the fact of a larger diameter of the swash-plate assembly in order to house the intermediate ring between the swash-plates and the pillars, as well as a low resistance and poor control of vibration, which leads to avoiding the use of rotating pillars. Finally, the use of rotating or non-rotating guide pillars does not prevent the simultaneous use of one or more torque links respectively non-rotating or rotating, because a device comprising at the same time non-rotating pillars and rotating pillars is to be ruled out, inasmuch as it does not allow all the tilting movements demanded by the cyclic pitch controls and ensured by the cardan ring.

In addition, in the non-rotating pillars device of DE-A-36 20 794, each of the two slides is arranged as a crosspiece, one branch of which slides axially without notable play and the other branch of which constitutes the trunnion enabling pivoting, by one of two diametrically opposite bearings, of the cardan ring on the pillars around a diametrical axis of the non-rotating plate, the ring being itself pivoting on the non-rotating plate, around the other diametrical and perpendicular axis, by two ball joints in two other diametrically opposite bearings.

The problem at the basis of the invention is to improve a pitch control swash-plate device comprising axial guide means for restraining rotation of the non-rotating plate, in such a way that it does not comprise two pairs of diametrically opposite bearing articulations, nor crosspieces, which are fragile parts expensive and tricky to manufacture, assemble and maintain, in order to enable the translations and tiltings of the swash-plates.

An object of the invention is to propose a pitch control system in which the non-rotating torque link(s) and the central sliding ball joint of the conventional devices are replaced by axial guide means engaging with more simple and hardy articulation means, and which are better suited to the various practical demands than those proposed by DE-A-36 20 794.

To this end, the pitch control device of the invention, of the type presented above, is characterised in that each of the two slides include rotational guide means, which guide respectively one of two guided parts on respectively one of two circular arc trajectories symmetrical to each other relative to the rotor axis and concentric around the second pivoting axis, which is perpendicular to the rotor, the two guided parts being diametrically opposite relative to the centre of the non-rotating plate which pivots on each of the two guided parts, around the first pivoting axis, by respectively one of the two trunnions and the corresponding bore, the guided parts engaging with the slides by being stopped in rotation around the rotor axis and guided in rotation with the non-rotating plate around the second pivoting axis, each on respectively one of said two circular arc trajectories.

A device is thus obtained which retains the advantages of known devices such as those with non-rotating pillars with respect to devices with non-rotating torque links and central sliding ball joint, without having the drawbacks connected to diametrically opposite articulation pairs and to crosspieces of these known devices with non-rotating pillars.

In particular, the movement, on the slides, of the two parts guided in rotation around the second pivoting axis of the swash-plates while the two trunnions enable the pivoting of the plates on the guided parts around the first of the two pivoting axes of the swash-plates and the slides translate along the rotor axis, enables in a simple and robust manner the crosspieces and the two other articulations, for example with a ball joint, of the prior art embodiments to be replaced.

Furthermore, it is not essential to provide an intermediate cardan ring between the non-rotating plate and the axial guide means, as is necessary in the prior art embodiments with non-rotating pillars, if each of the slides of the device of the invention is mounted so as to be maintained sliding along the corresponding axial guide means.

However, in order to simplify the guidance of the slides along the rotor axis, while improving the overall operation of the device by the simultaneous sliding of the slides, it is to advantage that the two slides are integral with a same rigid ring, non-rotating around the rotor axis and surrounding this axis, and on which ring the slides are diametrically opposite, so that the ring translates with the slides along the axial guide means. In addition, by means of the ring, the slides are held sliding on the axial guide means in a simple manner.

In this way, in the case of collective pitch variation, the two slides are translated along the rotor axis, with the ring where said ring is available, without possibility of rotation, neither around the rotor axis, nor around one or the other of the two pivoting axes, and the two guided parts follow the slides in their movements, and drive with them the non-rotating plate, activated by the control actuators, and moved in this way parallel to the pillars. In the case of cyclic pitch variation, the two guided parts rotate around the second pivoting axis by moving on the slides and by driving with them the non-rotating plate, and/or the non-rotating plate pivots around the first pivoting axis on the two guided parts, by means of the trunnions, under the action of the control actuators activating the non-rotating plate.

The rotation guide means on each slide include to advantage respectively one of two guide tracks, symmetrical to each other relative to the rotor axis and concentric around the second pivoting axis, and each guided part engages with the corresponding slide by being held in contact and guided on the corresponding guide track.

According to a simple and robust structure, each slide includes a part in the shape of a substantially cylindrical disc portion with axis merged with the second pivoting axis, and each guide track is delimited by a cylindrical surface portion with the same axis and arranged on the disc portion of the corresponding slide. In this case, it is advantageously simple that each guided part includes a pad sliding mounted on the guide track of the disc portion of the corresponding slide, and that each of the two trunnions projects radially outwards, relative to the centre of the non-rotating plate, on respectively one of the two pads, and pivots in respectively one of the two radial and coaxial bores, arranged in diametrically opposite positions in the non-rotating plate. Such an embodiment, in which the trunnions are integral with the pads, and pivot in the non-rotating plate, has a smaller radial or diametrical space requirement, relative to the rotor axis, than the variant in which the trunnions are integral with the non-rotating plate and project radially inwards from this latter, and pivot in bores provided in the pads.

It is possible for each guide track to be a cylindrical surface extending on the bottom of a groove, for example dove-tailed, arranged in the face in the radial external position, relative to the second pivoting axis, of the disc portion of the corresponding slide, and for each pad to be like a cotter pin, restrained sliding in the corresponding groove so as to slide against the guide track by being restrained from rotation around the rotor axis by contact of at least one of the sides of the pad with at least one of the lateral faces of the groove. In this case, each pad is integral with a trunnion projecting radially outwards beyond the groove in order to pivot in a corresponding bore of the non-rotating plate.

But, according to a more advantageously simple and cost-effective embodiment, each guide track extends on a face in an external radial position, relative to the second pivoting axis, of the disc portion of corresponding slide, and, more advantageously, each pad can be in the shape of a clevis straddling the corresponding disc portion and sliding through a cylindrical clevis bottom against the guide track on the external face of the said disc portion, one at least of the two sides of the clevis ensuring the restraining of the pad in rotation around the rotor axis on the corresponding slide by contact with at least one of the lateral faces of said disc portion.

Advantageously in this case, the two sides of the clevis of each pad are mounted with sliding adjustment against the two lateral faces of the corresponding disc portion, in order to prevent any relative rotation around the first pivoting axis between each pad and the corresponding slide, and in order that the slide ensures an excellent rotational restraint of the pad around the rotor axis.

To this end, it is advantageous for the two disc portions of the slides to have a same constant transverse dimension and to be symmetrical to each other relative to the rotor axis, and each projecting radially outwards from the corresponding axial guide means, relative to the rotor axis. This structure has also the advantage of enabling the presence of the axial guide means closer to the rotor axis, for example on or fixed to a tubular housing surrounding the rotor shaft, so that the device enables a substantial reduction in the space requirement of the assembly in the diametrical direction.

In such a configuration, it is advantageous for a face, in an internal radial position relative to the rotor axis, on the disc portion of each slide to have at least one sliding channel mounted with sliding adjustment on the corresponding axial guide means and with rotational immobilisation of the slide on the axial guide means around the rotor axis.

The axial guide means can include at least two splines, machined parallel to the rotor axis and diametrically opposite relative to this axis in the radial external face of a cylindrical support guide, which is coaxial with the rotor axis and fixed to the structure of the rotor aircraft, and which, when the swash-plates surround the rotor shaft, is a tubular support guide preferably integral with a tubular housing surrounding the base of the rotor shaft and itself fixed to the structure, and the slides are sliding mounted along the splines. This simple version comprising a reduced number of parts, has in addition the advantage of being very easy to machine and enables a simplification of the positioning of the parts, particularly because parallelism is easy to obtain for splines machined in the cylindrical support. On the other hand, this embodiment has a drawback in terms of wear and tear, because it requires the repair or changing of the tubular housing assembly with its cylindrical support in the event of wear of the grooves for example.

For this reason, according to a more practical embodiment in respect of wear of the parts, the axial guide means include two pillars non-rotating around the rotor axis, these pillars being parallel to this axis and symmetrical to each other in relation to this axis, and each slide slides along respectively one of the pillars, which are connected to the rotor aircraft structure. In this example, the pillars constitute wear parts, which are additional but easily replaceable parts saving any repair or replacement of the tubular housing and cylindrical support assembly.

To advantage, furthermore, each non-rotating pillar has a transverse "U" section open radially inwards, relative to the rotor axis, and each slide has at least one sliding channel of transverse "U" section, between the sides of which the pillar sides are mounted with sliding adjustment, so as to avoid any relative rotation between the slide and the corresponding pillar around the first pivoting axis while providing excellent rotational restraint around the rotor axis.

In a known way, the pillars can be fixed to the structure by means of supports fixed to a tubular housing, surrounding the base of the rotor shaft, and itself fixed to said structure, when the swash-plates surround the rotor shaft, which is most frequently the case. In this case, if the slides are secured to or integral with a ring, this latter also surrounds the pillars and the tubular housing, without increasing the transverse space requirement of the device, since this space requirement is essentially defined, in the radial direction relative to the rotor shaft, by the dimension of the pillars and of the disc portions of the slides.

The rotating plate can be rotated with the rotor in the standard way, with the help of at least one rotating torque link, with at least two arms articulated on each other and one of which is articulated on the rotating plate and the other articulated on the rotor shaft and/or hub.

But, if it is wished to reduce further the vertical or axial space requirement of the pitch control device and the rotor head on which the device is mounted, the rotating torque link(s) is or are removed, and the rotating plate is to advantage rotated with the rotor with the help of a driver, such as described in the French patent application FR 97 12126, to which reference will be made for more information.

It is sufficient to recall that such a rotating plate driver includes two rigid rotational drive tracks, extending at least in part substantially axially, parallel to the rotor axis, diametrically opposite relative to the rotor axis and rotating integrally with at least one of the two parts which are the rotor hub and shaft, each track engaging with respectively one of two drive pins, rotating integrally with the rotating plate and diametrically opposite on this latter, one of the two engaging components, which are a track and a pin, having two flanges between which the other component is engaged, so that each drive pin follows on the corresponding track a rectilinear trajectory, parallel to the rotor axis, in the case of variation in collective pitch, and a circular arc trajectory centred on the rotor axis, in the case of variation in cyclic pitch.

As described in FR 97 12126, each drive track is to advantage delimited in a substantially axial groove of the driver, and the corresponding pin is engaged in the groove. In order to have good resistance to fatigue and good flexural and torsional rigidity, each groove can be formed in a substantially axial part having a transverse "U" section of respectively one of two rigid driving arms, and the corresponding pin is engaged between the two flanges of the "U" groove of said arm, and in order to limit the transverse space requirement and the drag of the device, the "U" groove is radially open towards the rotor axis, and each pin projects outwards from the rotating plate, radially relative to the centre of said rotating plate.

In order to take account of the fact that the rotational driving stresses can be asymmetrical and alternate on the two flanges of the "U" groove of an arm, particularly during the variations of collective and cyclic pitch, one at least of the pins includes to advantage at least one pad and/or at least one roller respectively sliding and/or rolling against one at least of the two flanges of the "U" groove delimiting the corresponding drive track.

When said pin includes a pad, the pad is to advantage articulated relative to the rotating plate, at least in rotation around an axis passing through the centre of the rotating plate, on the rotor axis, and, in a preferred form, the pad has two lateral opposite faces substantially plane and parallel to the "U" groove flanges in which the pad slides, and the pad is mounted to rotate and slide around a pad support hub which is fixed on the external radial end of a pin support arm of the rotating plate.

As a variant, the pins can each comprise respectively one of two coaxial rollers, mounted diametrically opposite on the rotating plate and rolling around their common axis.

Figure 5:
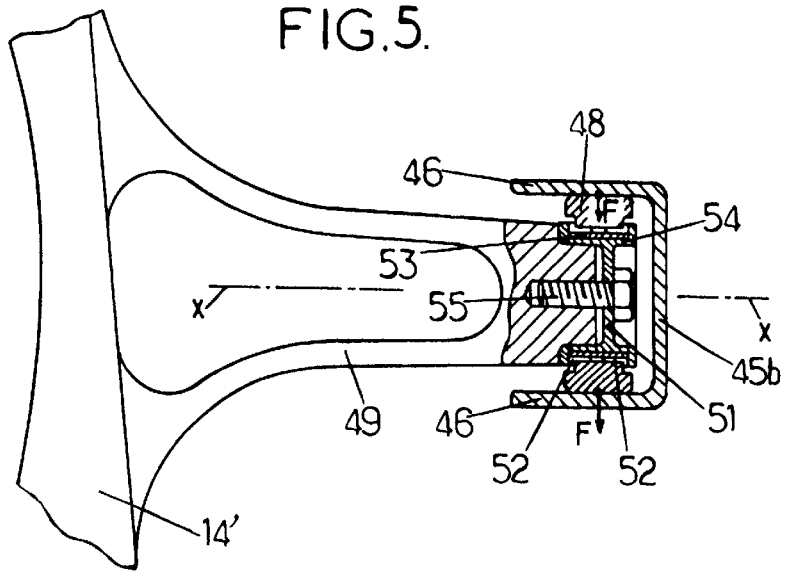
Figure 6:
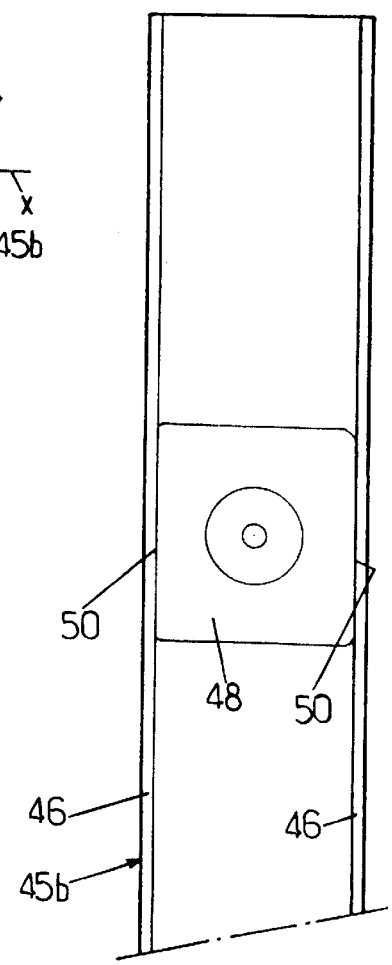
Figure 7:
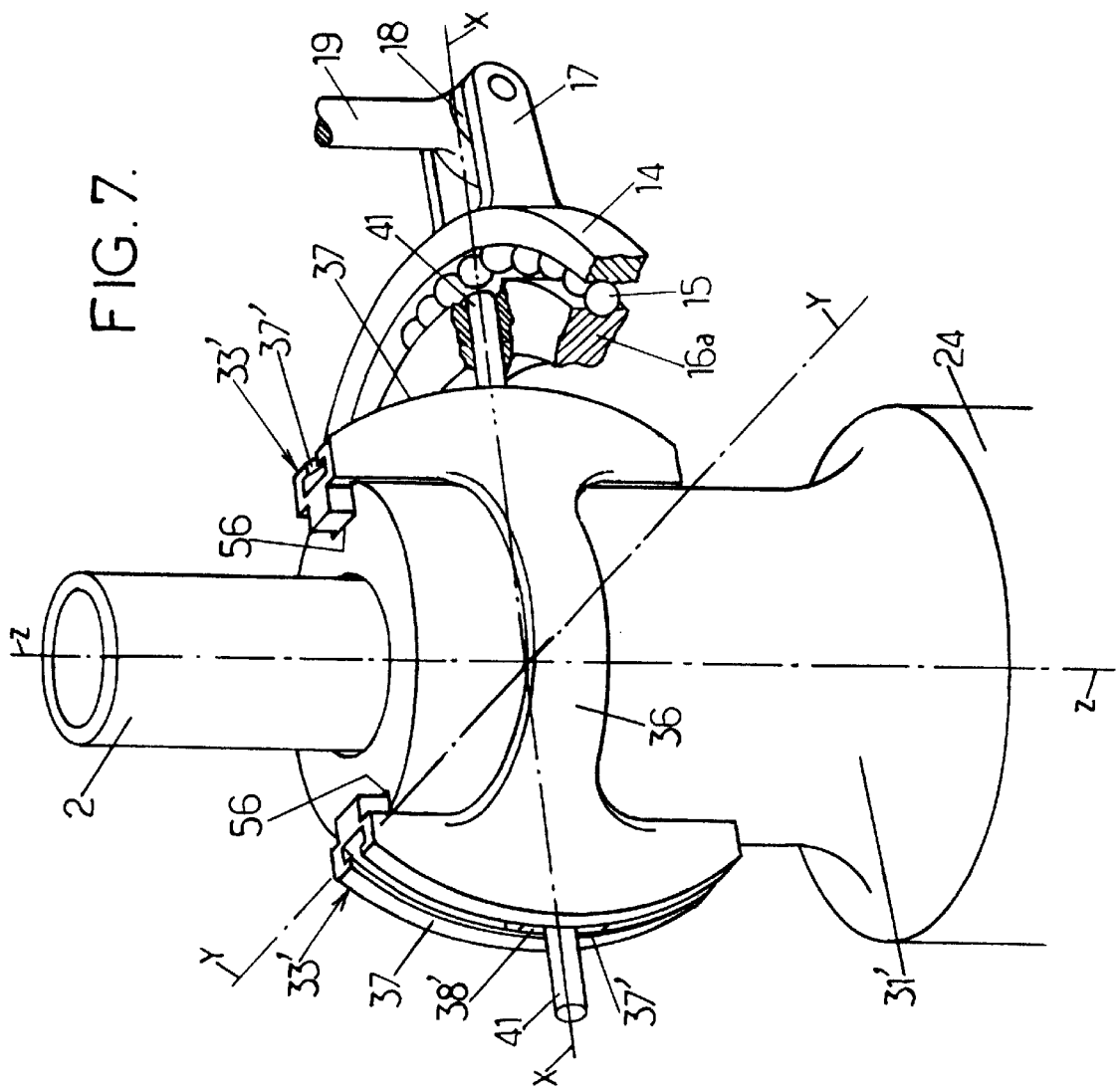

Other advantages and characteristics of the invention will arise from the description given below, as a non-restrictive example, of version examples described by reference to the appended drawings on which:

FIG. 1 is a diagrammatic and partial section view passing through the rotational axis of a helicopter main rotor fitted with an example of the pitch control device according to the invention, FIG. 2 is a partial sectional view along II—II of FIG. 1, FIG. 3 is a diagrammatic perspective view of a pitch control device similar to that of FIGS. 1 and 2, FIG. 4 is an axial half section view similar to FIG. 1 of a rotor fitted with a variant of the pitch control device according to the invention, FIG. 5 is a partial sectional view along V—V of the device of FIG. 4, FIG. 6 is a view along the arrow VI of FIG. 4, and FIG. 7 is a view similar to FIG. 3 of another variant of the pitch control device according to the invention.

On FIG. 1, the helicopter main rotor shown has a known structure: it includes essentially a hub 1 integral with the upper end of a tubular rotor shaft 2, rotated by its base around its axis z—z, which is the rotor rotational axis. Each rotor blade 3 (only one of which is partly shown in FIG. 1) is restrained by its root, and with the help of two transverse pins such as 4, in an external radial clevis 5a of a part 5 connecting the blade 3 to the hub 1. The part 5, called a sleeve in the following description, has an internal radial clevis 5b by which the sleeve 5 is connected to the hub 1 by restraining and articulation means 6, which restrain the sleeve 5 and the blade 3 against centrifugal forces, when the rotor rotates, and enable the angular clearances of the sleeve 5 and the blade 3 in pitch, around a longitudinal pitch change axis A—A, substantially radial relative to the rotor axis z—z, as well as in flapping and in drag, in the known way.

In this example, the retaining and articulation means 6 include a spherical laminated bearing of known structure, with a laminated central part 6a, constituted by an alternate stack of rigid cups and elastomer layers in the shape of spherical caps centred substantially in the external radial edge 1a of a corresponding cavity 1b in the hub 1, which is of the cavitied radial plate type, comprising as many axial cavities 1b as the rotor comprises blades 3. On either side of its central part 6a, the spherical laminated bearing 6, housed in the corresponding cavity 1b, includes an internal radial frame 6b, strut mounted between the branches of the internal clevis 5b of the sleeve 5 by threaded pins such as 7, and an external radial frame 6c fixed by screw-nut assemblies such as 8 on the external radial edge 1a of the corresponding cavity 1b. The spherical laminated bearing 6 is thus connected to the hub 1 by its external frame 6c and to the sleeve 5 by its internal frame 6b.

For each blade 3, a bottom flapping stop 9, fixed under the internal clevis 5b of the sleeve 5, engages with a droop-restraining ring 10, of known structure, mounted radially sliding around the shaft 2 in a guide ring 11 fixed, for example by bolts, to an external radial flange 12 of the shaft 2.

The shaft 2 is surrounded by a swash-plate assembly 13 of a pitch control device for the blades 3, the sleeve 5 of each of which is fitted, for this purpose, with a pitch lever 5c projecting laterally from the sleeve 5, for example on the side of the leading edge of the corresponding blade 3.

The swash-plate assembly 13 includes two annular plates, surrounding the rotor shaft 2, and one of which is a rotating plate 14 mounted to rotate with the help of two ball bearings 15 around the central part 16a of the other plate 16 which is a non-rotating plate. External radial devises 17, in equal number to the blades 3, are evenly distributed on the external periphery of the rotating plate 14, and in each clevis 17 is restrained a ball joint 18 articulating, on the rotating plate 14, the lower end of a pitch control rod 19 the upper end of which is articulated, also by a ball joint 20, in an end clevis of the pitch lever 5c of a corresponding blade 3. Under the rotating plate 14, the non-rotating plate 16 has three radial external devises 21, one of which is for example pointed to the helicopter rear and each of the two others laterally towards respectively one of the two sides of the helicopter, and in each of which is held a ball joint 22 articulating, on the non-rotating plate, the upper end of respectively one of three control actuators 23, for example double acting servo controlled jacks, the lower end of each of which is articulated, also by a ball joint (not shown) in a structure clevis of the helicopter, for example on the conical housing 24, which is fixed to the helicopter structure and surrounds the connection of the base of the rotor shaft 2 to the outlet of the main gear box, in order to rotate the shaft 2.

In order to rotate the rotating plate 14 around the axis Z—Z, the plate 14 is also articulated, on its periphery and between the devises 17, to two rotating parts 25 (only one of which is shown in FIG. 1), connecting the rotating plate 14 to the rotor shaft 2. This rotating part can be a rotating torque link 25 of conventional structure, with two arms 25a and 25b articulated by pivoting one on the other and one 25a by a ball joint 26 on the rotating plate, and the other 25b by pivoting in a clevis 27 of a torque link driver constituted, in this example, by the ring 11 fixed to the flange 12 of the shaft 2.

The two coaxial plates 14 and 16 can be axially translated, parallel to the rotor axis Z—Z, and tilted in any direction around this axis Z—Z by an axial translation and tilting guide mechanism according to the invention, which holds the plates 14 and 16 centred on the rotor axis Z—Z.

This guide mechanism includes two fixed axial guide pillars and a non-rotating and non-pivoting ring with two slides guided in translation by the pillars and themselves guiding pads in rotation around a diametrical axis Y—Y of the non-rotating plate 16, perpendicular to the rotor axis Z—Z, and on which pads the non-rotating plate pivots around another diametrical axis X—X of this plate 16, which is perpendicular to the diametrical axis Y—Y.

More exactly, two pillars 28 parallel to each other and to the rotor axis Z—Z and diametrically opposite relative to this axis Z—Z, i.e. symmetrical to each other relative to the axis Z—Z, are fixed to the helicopter structure, each being restrained by upper 29 and lower 30 fixing tabs, respectively radial and axial relative to the axis Z—Z and integral with the upper and lower end parts of the considered pillar 28, these fixing tabs 29 and 30 being screwed respectively on the upper end face and against the lateral face of a tubular support 31, coaxial with the shaft 2 rotationally guided in the support 31 by the bearings 32, positioned and retained by the support 31, which is integral with the upper end of the conical housing 24. The pillars 28 are thus fixed to the outside of the support 31, in immediate proximity and along this latter.

Along each pillar 28 is sliding mounted, parallel to the axis Z—Z, respectively one of two slides 33 each having substantially the shape of respectively one of two diametrically opposite sectors or portions of a same cylindrical disc with axis merged with a diametrical axis Y—Y of the non-rotating plate 16, which is perpendicular to the rotor axis Z—Z and cuts the axis Z—Z at the centre of the plates 14 and 16. The two slides 33 in the shape of disc portion have a same constant transverse dimension between their parallel sides 34, and the two slides 33 are symmetrical to each other relative to the axis Z—Z and each overhanging or projecting substantially radially outwards from the corresponding pillar 28 relative to the axis Z—Z.

As seen also in FIG. 2, each pillar 28 has a transverse "U" section open radially inwards (relative to the axis Z—Z) with two sides 28a parallel to each other and to the axis Z—Z, substantially radial and mounted with sliding adjustment between and against the sides 34 of the corresponding slide 33, which sides 34 delimit in the face, in the internal radial position relative to the axis Z—Z, of the slide 33 and in the axial end parts (upper and lower in FIG. 1) of this internal face, two axial sliding channels 35 each having a transverse "U" section open radially inwards, for receiving the corresponding pillar 28. Simultaneously, the restraining against rotation of the slide 33 on the pillar 28 around the rotor axis Z—Z is thus ensured.

As seen also on the variant of FIG. 3, on which the same numerical references designate the similar components, the two slides 33 are in a single piece with a rigid ring 36, on which the slides 33 are diametrically opposite, and which is mounted around the pillars 28 and the support 31, a short distance radially from the support 31 in order to decrease the diametrical or transverse space requirement of the assembly. The ring 36 thus translates with the slides 33 along the pillars 28 and is non-rotating around the axis Z—Z. This ring 36 also holds the slides 33 in the sliding engagement position with the pillars 28.

On each slide 33 in the shape of a disc portion, the face in the external radial position, relative to the axis Z—Z or to the axis Y—Y, is respectively one of two diametrically opposite portions, relative to the axis Y—Y, of a cylindrical surface with axis Y—Y, and constitutes a guide track 37 for respectively one of two pads 38 guided in rotation around the axis Y—Y by movement on the guide tracks 37 of the slides 33.

Each pad 38 has the shape of a clevis straddling the corresponding slide 33, and which comprises a cylindrical clevis bottom 39, with concavity turned towards the Y—Y axis and of Y—Y axis, so as to slide against the cylindrical and coaxial guide track 37 of the slide 33. This clevis bottom 39 is located between two clevis sides 40, which extend parallel to each other and substantially radially towards the axis Z—Z, and which are mounted with sliding adjustment against the external faces of the two sides 34 of the slide 33, in order to guide the sliding of the pad 38 on the track 37 of the slide 33 in rotation around the diametrical axis Y—Y of the non-rotating plate 16, while ensuring the restraining of the pad 38 in rotation around the axis Z—Z on the slide 33 by contact between the sides 34 and 40.

Each pad 38 comprises also, on the external convex face of its clevis bottom 39, a cylindrical trunnion 41, in a single piece with the pad 38 and projecting radially outwards, relative to the centre of the non-rotating plate 16, at the intersection of the axes Z—Z and Y—Y, and each of the two trunnions 41 is pivotingly mounted in respectively one of two cylindrical radial and diametrically opposite bores in the non-rotating plate 16, these bores emerging in the internal radial face of the central part 16a of this plate 16 and being coaxial around another diametrical axis X—X of the non-rotating plate 16, which is perpendicular to the diametrical axis Y—Y.

Thus, the non-rotating plate 16, and therefore the two plates 14 and 16, can pivot around the axis X—X relative to the pads 38, whereas the pads 38 can pivot with the plates 14 and 16 around the diametrical axis Y—Y by sliding on the guide tracks 37 of the slides 33, which can translate axially with the ring 36 along the pillars 28, translating in this way the plates 14 and 16.

The assembly of the ring 36 with the slides 33 and the two pads 38 fitted with trunnions 41 and sliding in rotation on the slides 33 is functionally equivalent to a cardan joint sliding on the outside of the pillars 28 and between these latter and the non-rotating plate 16, and enables, on the one hand, the translations, parallel to the rotor axis Z—Z, of the plates 14 and 16 with the slides 33 and the ring 36, guided by the pillars 28 in order to control the collective pitch variations, and, on the other hand, the tilting of the plates 14 and 16 in any direction around the axis Z—Z to control variations in cyclic pitch, by pivoting the plates 14 and 16 relative to the pads 38 around the axis X—X of the trunnions 41 and/or pivoting of the plates 14 and 16 with the pads 38 relative to the slides 33 and the ring 36 around the axis Y—Y, under the action of the control actuators 23 activating the non-rotating plate 16.

It is understood that, during a collective pitch variation, the slides 33 slide on the two pillars 28 by moving with the ring 36 parallel to the pillars 28, and without rotating either around the axis Y—Y, or around the axis X—X, or again around the axis Z—Z. On the other hand, during a cyclic pitch variation with rotation around the axis Y—Y, the two pads 38 slide on the slides 33 by tilting the plates 14 and 16 relative to the pillars 28. It is understood that the sliding adjustment of the two sides 40 of each pad 38 on the sides 34 of the corresponding slide 33 prevents any rotation of the pad 38 relative to the slide 33 around the axis X—X.

It is also understood that the sliding adjustment of the two sides 28a of each "U" pillar 28 in the two sliding channels 35 of the corresponding slide 33 prevents any rotation of this slide 33 relative to the pillar 28 around the axis X—X. Simultaneously, these mountings of each pad 38 on the corresponding slide 33 and of each slide 33 on the corresponding pillar 28 prevent the rotations of the pads 38 and of the slides 33 around the rotor axis Z—Z. In that way, the non-rotating plate 16 is in fact restrained against any rotation around this axis Z—Z, by the fixed pillars 28, the slides 33 and the ring 36, and the pads 38 and trunnions 41.

In order to further decrease the axial space requirement of the device, it is possible, as shown on the variant of FIGS. 4, 5 and 6, to replace the rotating torque link(s) such as 25 by a rotating plate driver such as described in the French patent application FR 97 12126, and the effects of which combine with advantage with those means according to the invention and described above, for the restraining in rotation of the non-rotating plate 16 around the rotor axis Z—Z. In the swash-plate assembly 13' of FIGS. 4 to 6, the non-rotating plate 16 is identical to that of the previous example and the same numerical references designate the similar components, whereas the rotating plate 14' is driven by the driver.

It is recalled that, according to FR 97 12126 to which reference may be made for more information, in the rotating of the rotating plate 14' with the rotor is ensured by a driver 44. In FIG. 4, the driver 44 includes two rigid arms 45, diametrically opposite relative to the rotor axis Z—Z and fixed under a flange 42 by which a tubular and central base 1c of the hub 1 is fixed by a ring of bolts 43 to an upper flange 2a of the rotor shaft 2, in this example. The driver 44 thus rotates integrally with the shaft 2, on top of the swash-plate assembly 13'. Each arm 45 includes a part 45a substantially radial relative to the axis Z—Z and extended by an axial part 45b parallel to the axis Z—Z over the major part of its axial length, and slightly curved towards the axis Z—Z at its lower end and at its upper end connecting to the radial part 45a. The axial arm part 45b has a transverse "U" section delimiting a groove open radially towards the rotor axis Z—Z. The internal faces of the two flanges 46 of the "U" groove in each arm axial part 45b form thus a rigid rotational drive track for respectively one of two drive pins 47 integral with the rotating plate 14' and diametrically opposite on this latter, each pin 47 projecting radially outwards from the rotating plate 14' and being engaged between the two flanges 46 of the "U" groove of respectively one of the arm axial parts 45b.

In this variant, in which the rotational drive of a pin 47 is carried out with a contact force F applying alternately on one or other of the two flanges 46 (see FIG. 5) of the "U" groove, each pin 47 includes a pad 48 sliding alternately against one or other of the two flanges 46 of the axial part 45b of the corresponding rigid arm 45 of the driver 44. In order to facilitate the transfer of load between the flanges 46 and the pad 48, reducing friction, the internal face of the flanges 46 can have a carbide coating on its zone corresponding to the trajectory of the pad 48, the zones of its external faces of which, engaging with the flanges 46, can also have carbide coatings. Each pad 48 has the general external shape of a relatively flat rectangle parallelepiped, drilled with a cylindrical central circular section aperture. Through this aperture, each pad 48 can be articulated, rotating around a first diametrical axis x—x of the rotating plate 14', relative to this rotating plate 14', to which the pad 48 is connected by a pin support arm 49 radial relative to the centre of the rotating plate 14' and in one piece with this latter, for example in aluminium, while the driver 44 and its arm 45 are for example in steel. In the particular position of the rotating plate 14' in FIG. 4, the axes x—x and X—X are merged, but the axis x—x is a rotating axis, while the axis X—X is a non-rotating axis around the rotor axis Z—Z. Each pad 48 thus has two opposite lateral faces 50 which are plane and parallel to each other as well as to the flanges 46 of the "U" groove in which the pad 48 slides, and through its central aperture each pad 48 is rotating and slidingly mounted around a pad support hub 51 on the external radial end of the pin support arm 49. To this end, anti-friction shouldered rings 52 are mounted in the central aperture of the pad 48, and around an anti-friction ring 53 housed in the bottom of a "U" groove delimited by an annular rim 54 at the periphery of the hub 51, which is centred by its rim 54 around the cylindrical external radial end of the pin support arm 49 and held against this end by the head of a screw 55 with shank passing through the central part of the hub 51 and screwed in this end of the arm 49.

In this variant, the substantially radial part 45a of each driver arm 45 can have a "U" structure open towards the bottom, i.e. towards the swash-plate assembly 13', or a box-type structure in order to provide more rigidity.

In operation, the trajectory and the performance of the pads 48 are as follows: for cyclic pitch, the two pads 48 slide in the "U" grooves of the arm axial parts 45b of the driver 44 following an alternate circular trajectory portion (sinusoidal movement) around a second diametrical axis y—y (perpendicular to x—x) of the rotating plate 14'. [Just as for the axes X—X and x—x, Y—Y and y—y are merged in the particular position of the rotating plate 14' in FIG. 4, but y—y is a rotating axis while Y—Y is non-rotating around Z—Z]. In the case of collective pitch variation, the two pads 48 slide in the "U" grooves between the flanges 46 following a rectilinear trajectory, parallel to the rotor axis Z—Z, upwards (towards the hub 1) or downwards (towards the structure and the conical housing 24) according to the desired collective pitch.

During these movements, the rotating plate 14' can follow the tilting movements of the non-rotating plate 16 without risk of wedging pads 48 in the sliding channels 45b due to the rotation of the rotating plate 14' around the axis x—x relative to the pads 48.

In a variant, as described in FR 97 12126, each pin 47 can include respectively one of two coaxial rollers each rolling in respectively one of the "U" grooves, against at least one of the flanges 46 of the "U" groove delimiting the corresponding drive track, and around the common axis of the rollers, which is the diametrical axis x—x of the rotating plate 14'. In order to remove all risk of sliding during change in collective pitch (trajectory parallel to the rotor axis Z—Z), each roller is preferably a ball joint roller, as shown in a larger scale in FIG. 4a of the aforementioned patent application.

In the examples described above, the two pillars 28 can be considered as wear parts, saving any repair or any change of the housing 24 and tubular support 31 assembly. But, in the variant of FIG. 7, simpler but not necessarily more practical in the event of wear and tear of the parts, the pillars are removed and replaced by splines 56 parallel to the rotor axis Z—Z and machined in diametrically opposite parts relative to this axis Z—Z, directly in the external radial face of the cylindrical tubular support 31', which is coaxial with the axis Z—Z and integral with the tubular housing 24 fixed to the structure.

In this variant, the two slides 33' are sliding mounted in the splines 56 of the support 31', and the ring 36 holds the slides 33' in sliding engagement position with these splines 56. This variant of FIG. 7 is attractive, because the number of parts is reduced by the removal of the pillars 28, and because it is easy to machine in the cylindrical tubular support 31' splines 56 respecting excellent parallelism with the axis of this support 31', the result of which is a simplification of the positioning of the parts, because it is then easier to position the splines 56 parallel to the rotor axis Z—Z than pillars 28 added to the support 31, as in the previous examples. Clearly, when the pillars are replaced by axial splines 56 in the external face of the cylindrical support 31', as axial guide means of the slides 33', the sliding channel(s) of each slide 33' in its internal radial face, relative to the axis Z—Z, is of a shape adapted to the sliding engagement with the spline(s) 56 in which each slide 33' slides, which can, in addition, be similar to the slides 33 of the previous examples and engage in the same way with one of two pads 38 within a swash-plate device 13 or 13' as in FIGS. 1 and 4 respectively.

As a variant however, each guide track can extend no longer on the cylindrical face 37 in the external radial position on the cylindrical disc portion of the corresponding slide 33', but on the bottom, in the shape of a cylindrical surface portion coaxial around the axis Y—Y, of a groove 37', possibly dove tailed, arranged in the external radial face 37, and each pad 38' can be sliding restrained, like a cotter pin, in the corresponding groove 37', so as to slide against the guide track of the bottom of this groove, and by being rotation restrained around the rotor axis Z—Z by contact of the sides of the pad 38' with the lateral faces of the groove 37' in which this pad 38' slides. The corresponding trunnion 41, still projecting radially outwards on the external radial face of each pad 38', comes out then from the groove 37', and projects radially outwards from the disc portion of the corresponding slide 33'.

For the remainder, the operation of this device and its engagement with the rotating 14 or 14' and non-rotating 16 plates are identical to what has been previously described, with the additional characteristic that the slides 33' are stopped rotating around the rotor axis Z—Z by their sliding mounting in the splines 56 of the cylindrical support 31'.

The splines 56, replacing the pillars 28, can also not be directly machined in the external face of the cylindrical support 31', but in the external face of a wear sleeve added around the cylindrical support 31', and easy to replace in the case of wear, without having to repair or change the tubular housing 24 and support 31' assembly. It is understood that the variants without a pillar also enable further reduction in the diametrical space requirement of the device.

The pitch control devices of the invention described above, enable main rotor mast-hub assemblies to be obtained with a smaller vertical or axial space requirement in comparison with known embodiments with non-rotating torque links for restraining the non-rotating plate and of simpler and more robust structure, and therefore more cost effective to build, assemble and maintain in comparison with known embodiments with non-rotating pillars for restraining rotation and guiding in translation and tilting of the non-rotating plate. In particular, in comparison with these latter known embodiments, the devices of the invention comprise fewer pieces, are lighter and have a smaller radial or diametrical space requirement relative to the rotor axis.

We claim:

1. A pitch control device for blades of an aircraft rotor in which each blade is, firstly, rotated around a rotational axis of a shaft of the rotor by means of a hub rotating integrally with the shaft, and, secondly, rotating integrally, around a longitudinal pitch change axis of the blade, with at least one pitch lever controlled by a corresponding pitch rod, connected to a plate rotating with the rotor and belonging to a swash-plate assembly in which the rotating plate is mounted to rotate on a non-rotating plate, restrained against any rotation around the rotor axis, the two plates being annular, centred on the rotor axis and surrounding said rotor axis, and being able to be translated parallel to the rotor axis and tilted in any direction around the rotor axis, under action of control actuators connecting the non-rotating plate to a structure of the rotor aircraft, in order to control respectively the collective pitch and cyclic pitch of the blades, the non-rotating plate being restrained from rotating with the help of axial guide means non-rotating around the rotor axis, which axial guide means are parallel to said rotor axis, diametrically opposite relative to said rotor axis, and connected to the structure, and which guide the plates in translation along the rotor axis with the help of two slides sliding along the axial guide means and belonging to an articulated connection which connects the non-rotating plate to the axial guide means and enables the tilting of the plates in any direction around the rotor axis by pivoting the non-rotating plate around two diametrical axes of said non-rotating plate, which diametrical axes are perpendicular to each other and one of which remains perpendicular to the rotor axis, the pivoting around a first of the two diametrical axes being ensured in diametrically opposite positions on the non-rotating plate, by two trunnions pivoting in radial and coaxial bores, wherein each of the two slides includes rotational guide means, which guide respectively one of two guided parts on respectively one of two circular arc trajectories symmetrical to each other relative to the rotor axis and concentric around the second diametrical axis, which is perpendicular to the rotor axis, the two guided parts being diametrically opposite relative to the centre of the non-rotating plate which pivots on each of the two guided parts, around the first diametrical axis, by respectively one of the two trunnions and the corresponding bore, the guided parts engaging with the slides being stopped from rotation around the rotor axis and guided in rotation with the non-rotating plate around the second diametrical axis, each on respectively one of the two trajectories.

2. A device according to claim 1, wherein the two slides are integral with a same rigid ring, non-rotating around the rotor axis and surrounding said rotor axis, and on which ring the slides are in a diametrically opposite position so that the ring translates with the slides along the axial guide means.

3. A device according to claim 1, wherein the rotational guide means on each slide include respectively one of two guide tracks, symmetrical to each other relative to the rotor axis and concentric around the second diametrical axis, and each guided part engages with the corresponding slide by being held in contact and guided on the corresponding guide track.

4. A device according to claim 3, wherein each slide includes a part in the shape of a substantially cylindrical disc portion with its axis merged with the second diametrical axis, and each guide track is delimited by a cylindrical surface portion having an axis merged with said second diametrical axis, said cylindrical surface portion being arranged on the disc portion of the corresponding slide.

5. A device according to claim 4, wherein each guided part includes a pad slidingly mounted on the guide track of the disc portion of the corresponding slide, and each of the two trunnions projects radially outwards, relative to the centre of the non-rotating plate, on respectively one of the two pads and pivots in one respectively of the two radial and coaxial bores arranged in diametrically opposite positions in the non-rotating plate.

6. A device according to claim 5, wherein each guide track extends on the bottom of a groove arranged in a face in an external radial position, relative to the second diametrical axis of the disc portion of the corresponding slide, and each pad is restrained slidingly in the corresponding groove so as to slide against the guide track by being restrained from rotating around the rotor axis by contact of at least a side of the pad with at least a lateral face of said groove.

7. A device according to claim 5, wherein each guide track extends on a face in an external radial position, relative to the second diametrical axis, of the disc portion of the corresponding slide.

8. A device according to claim 7, wherein each pad is in the form of a clevis straddling the corresponding disc portion and sliding through a cylindrical clevis bottom against the guide track on the external face of said disc portion, at least one of two sides of the clevis ensuring the restraint of the pad from rotating around the rotor axis on the corresponding slide by contact with at least one of two lateral faces of said disc portion.

9. A device according to claim 8, wherein the two sides of the clevis of each pad are mounted with sliding adjustment against the two lateral faces of the corresponding disc portion.

10. A device according to claim 4, wherein the disc portions of the two slides have a same constant transverse dimension and are symmetrical to each other relative to the rotor axis, and each disc portion projects radially outwards from the axial guide means relative to the rotor axis.

11. A device according to claim 4, wherein a face, in an internal radial position relative to the rotor axis, on the disc portion of each slide has at least one sliding channel mounted with sliding adjustment on the axial guide means and with rotational immobilization of the slide on the axial guide means around the rotor axis.

12. A device according to claim 1, wherein the axial guide means include at least two splines parallel to the rotor axis and machined diametrically opposite relative to said rotor axis in an external radial face of a cylindrical tubular support coaxial with the rotor axis and integral with a tubular housing surrounding a base of the rotor shaft, said tubular housing being fixed to the structure, and the slides being slidingly mounted along the splines.

13. A device according to claim 1, wherein the axial guide means includes two pillars non-rotating around the rotor axis, said pillars being parallel to said rotor axis and symmetrical to each other relative to said rotor axis, and each slide sliding along respectively one of the pillars which are connected to the structure.

14. A device according to claim 13, wherein each pillar has a transverse "U" section open radially inwards, relative to the rotor axis, and each slide has at least one sliding channel of transverse "U" section, with sides between which sides of the pillar are mounted with sliding adjustment.

15. A device according to claim 13, wherein the pillars are fixed to the structure by means of supports fixed to a tubular housing surrounding a base of the rotor shaft, said tubular housing being fixed to said structure.

16. A device according to claim 1, wherein the rotating plate is rotated with the rotor with the help of at least one rotating torque link, including at least two arms articulated on each other and one of said arms is on the rotating plate, whereas the other of said arms is articulated on an assembly including the rotor shaft and rotor hub.

17. A device according to claim 1, wherein the rotating plate is rotated with the rotor with the help of a driver including two rigid rotational drive tracks, extending at least in part substantially axially, parallel to the rotor axis, diametrically opposite relative to said rotor axis and rotating integrally with at least one of the two parts which are the rotor hub and shaft, each drive track engaging with respectively one of two drive pins, rotating integrally with the rotating plate and diametrically opposite on said rotating plate, one of the two engaging components which are a drive track and a drive pin having two flanges between which the other component is engaged, so that each drive pin follows on the corresponding drive track a rectilinear trajectory, parallel to the rotor axis, in the case of collective pitch variation, and a circular arc trajectory centred on the rotor axis, in the case of cyclic pitch variation.

18. A device according to claim 17, wherein each drive track is delimited in a substantially axial groove of the driver, and the corresponding drive pin is engaged in the groove.

19. A device according to claim 18, wherein each groove is formed in a substantially axial part having a "U" transverse section of respectively one of two rigid driving arms, and the corresponding drive pin is engaged between the two flanges of the "U" groove of said arm.

20. A device according to claim 19, wherein said "U" groove opens radially towards the rotor axis, and each drive pin projects outwards from the rotating plate, radially relative to the centre of said rotating plate.

21. A device according to claim 19, wherein at least one of the drive pins includes at least one pad sliding against at least one of the two flanges of the "U" groove delimiting the corresponding drive track.

* * * * *